United States Patent
Arisawa

(10) Patent No.: US 8,452,343 B2
(45) Date of Patent: May 28, 2013

(54) PORTABLE TERMINAL

(75) Inventor: Yukihiko Arisawa, Akishima (JP)

(73) Assignee: Fujitsu Mobile Communications Limited, Kawasaki (JP)

(*) Notice: Subject to any disclaimer, the term of this patent is extended or adjusted under 35 U.S.C. 154(b) by 403 days.

(21) Appl. No.: 11/732,467

(22) Filed: Apr. 2, 2007

(65) Prior Publication Data

US 2008/0039152 A1    Feb. 14, 2008

(30) Foreign Application Priority Data

Aug. 11, 2006  (JP) ................................. 2006-220367

(51) Int. Cl.
*H04M 1/00*   (2006.01)
*H04M 13/00*  (2006.01)
*H04M 5/00*   (2006.01)
*H04M 3/00*   (2006.01)

(52) U.S. Cl.
USPC ........ 455/567; 455/569.1; 379/164; 379/179; 379/252; 379/373.01; 379/374.03; 379/375.01; 379/376.01; 379/418

(58) Field of Classification Search
CPC ..... H04M 19/047; H04M 11/00; H04M 19/04; H04W 88/028; H04W 84/02
USPC ................................................. 455/567, 574
See application file for complete search history.

(56) References Cited

U.S. PATENT DOCUMENTS

| | | | | |
|---|---|---|---|---|
| 6,728,349 | B2* | 4/2004 | Chang et al. | 379/93.23 |
| 2002/0075153 | A1* | 6/2002 | Dahl | 340/573.1 |
| 2004/0203651 | A1* | 10/2004 | Qu et al. | 455/414.1 |
| 2004/0224685 | A1* | 11/2004 | Hertzberg et al. | 455/434 |
| 2005/0041793 | A1* | 2/2005 | Fulton et al. | 379/211.01 |
| 2005/0170792 | A1* | 8/2005 | Helferich | 455/100 |
| 2005/0170817 | A1* | 8/2005 | Matsutaka | 455/415 |

FOREIGN PATENT DOCUMENTS

JP    2002-101167 A    4/2002

OTHER PUBLICATIONS

Motorola V710 CDMA Celluar Phone Operators Manual, 2004 pp. 25, 28, 48, 60, 78, 72, 81, and 88.*
Tom's Hardware Weblog entry Mar. 11, 2005.*

* cited by examiner

*Primary Examiner* — Charles Appiah
*Assistant Examiner* — Joshua Schwartz
(74) *Attorney, Agent, or Firm* — Maschoff Brennan

(57) ABSTRACT

A portable terminal includes an output device configured to output a ringing tone, a vibrator configured to generate vibration, and a first controller configured to detect a missed call indicating that an incoming call response operation is not performed, and a second controller coupled to the first controller. The second controller is configured, if the first controller detects the missed call, to notify a missed call notification at predetermined time intervals by at least one of the ringing tone output from the output device and the vibration generated by the vibrator, the missed call notification indicating that a response operation for the missed call is not performed.

6 Claims, 5 Drawing Sheets

PORTABLE TERMINAL

CROSS-REFERENCE TO RELATED APPLICATIONS

This application is based upon and claims the benefit of priority from prior Japanese Patent Application No. 2006-220367, filed Aug. 11, 2006, the entire contents of which are incorporated herein by reference.

BACKGROUND OF THE INVENTION

1. Field of the Invention

The present invention relates to a portable terminal.

2. Description of the Related Art

Upon reception of an incoming speech call or email, a cellular phone as the portable terminal notifies a user of this reception result by generating a ringing tone or vibration. However, for example, when the user puts the cellular phone in a bag or when the cellular phone is away from the user, the user sometimes does not notice the incoming call. In consideration of such situation, the current cellular phone generally has a function of notifying the user of a missed call by blinking an incoming call lamp such as an LED.

However, for example, when the cellular phone is kept in a bag, blinking of the LED or the like does not allow the user to notice the missed call. Hence, the user does not notice the missed call until the user opens the bag and checks the cellular phone.

BRIEF SUMMARY OF THE INVENTION

A portable terminal according to an aspect of the present invention includes an output device configured to output a ringing tone, a vibrator configured to generate vibration, a first controller configured to detect a missed call indicating that an incoming call response operation is not performed, and a second controller coupled to the first controller, and configured, if the first controller detects the missed call, to notify a missed call notification at predetermined time intervals by at least one of the ringing tone output from the output device and the vibration generated by the vibrator, the missed call notification indicating that a response operation for the missed call is not performed.

A portable terminal according to another aspect of the present invention includes an output device configured to output a ringing tone, a vibrator configured to generate vibration, a first controller configured to detect existing unread email upon after an email reception, and a second controller coupled to the first controller, and configured, if the first controller detects the unread email, to notify an unread email notification at predetermined time intervals by at least one of the ringing tone output from the output device and the vibration generated by the vibrator, the unread email notification indicating that a reading operation for the missed call is not performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the accompanying drawing.

Figure 1:
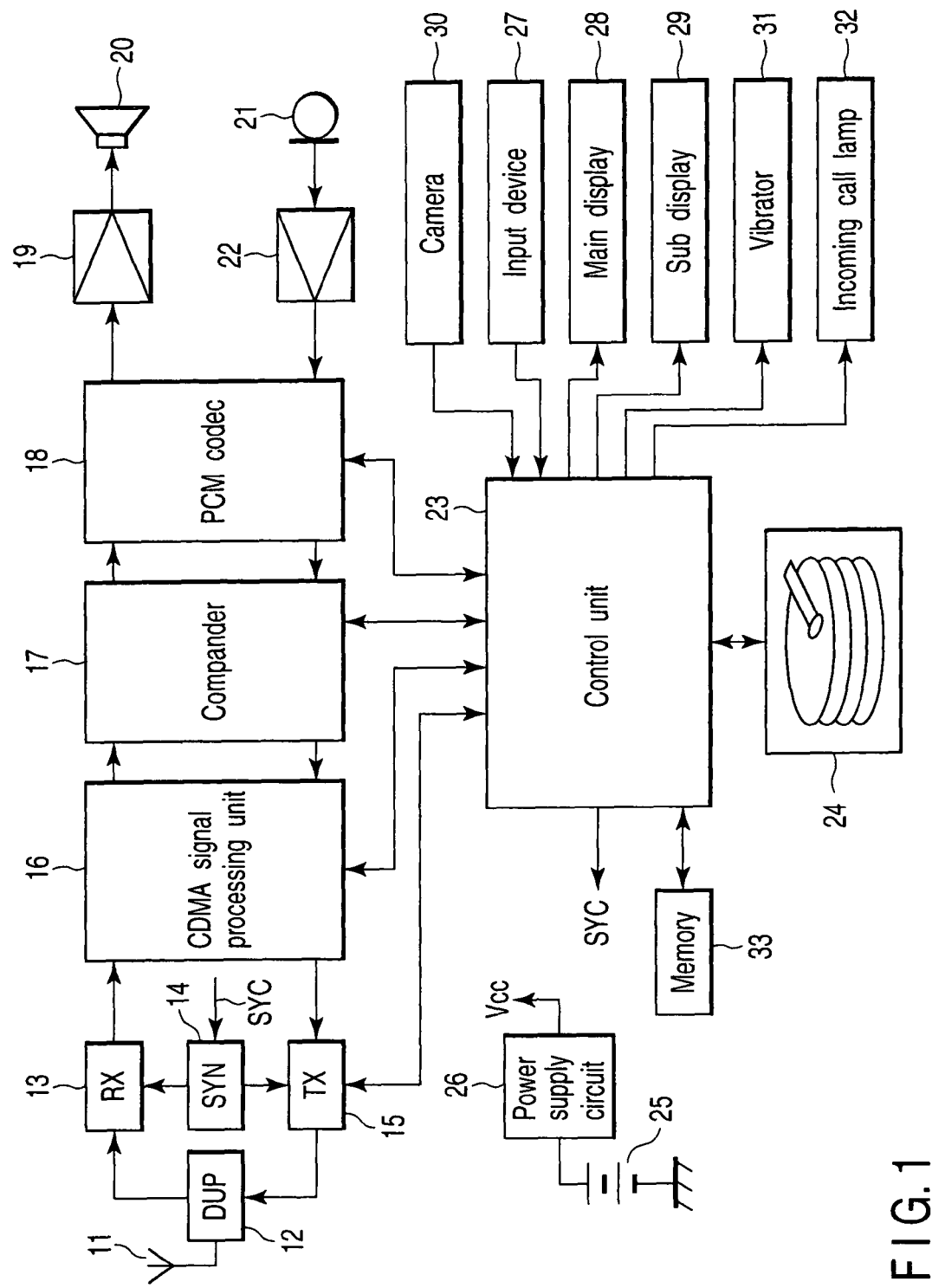
FIG. 1 is a block diagram showing the arrangement of a cellular phone as a portable terminal according to an embodiment of the present invention.

FIG. 1 is a block diagram showing the arrangement of a cellular phone as a portable terminal according to an embodiment of the present invention.

A radio signal transmitted from a base station (not shown) is received by an antenna 11, and is input to a reception circuit (RX) 13 via an antenna duplexer (DUP) 12. The reception circuit 13 frequency-converts (down-converts) the received radio signal to an intermediate-frequency signal by mixing it with a local oscillation signal output from a frequency synthesizer (SYN) 14. The reception circuit 13 then quadrature-demodulates this down-converted intermediate-frequency signal to output a received baseband signal. Note that the frequency of the local oscillation signal generated by the frequency synthesizer 14 is designated by a control signal SYC from a control unit 23.

The received baseband signal is input to a CDMA signal processing unit 16. The CDMA signal processing unit 16 comprises a RAKE receiver. The RAKE receiver despreads paths included in the received baseband signal by spread codes. The despread path signals are mixed after their phases are arbitrated. As a result, reception packet data of a predetermined transmission format is obtained. The reception packet data is input to a compander 17.

In speech communication, the compander 17 decodes, by a speech codec, speech data contained in the reception packet data output from the CDMA signal processing unit 16. A digital audio signal obtained by this decoding process is output to a PCM codec 18. The PCM codec 18 PCM-decodes this digital audio signal and outputs an analog speech signal. This analog speech signal is amplified by an incoming speech amplifier 19, and is then output from a loudspeaker 20.

Upon receiving email or downloading contents, the compander 17 sends, to the control unit 23, email data or content data contained in the reception packet data. The control unit 23 stores the email data or content data sent from the compander 17, in a hard disk unit (HDD unit) 24.

Upon reception of an email display request via an input device 27, the control unit 23 reads out corresponding email data from the HDD unit 24, and displays it on a main display 28.

Upon reception of a content playback request via the input device 27, the control unit 23 reads out corresponding content data from the HDD unit 24.

When the content data is audio content data, the control unit 23 outputs the audio data to the compander 17. The audio data is decoded by the compander 17, and then converted into an analog signal by the PCM codec 18. After that, the converted audio data is amplified by the incoming speech amplifier 19, and output from the loudspeaker 20.

On the other hand, when the content data is video content data, the control unit 23 decodes the video data by an internal video codec, and displays it on the main display 28.

In speech communication, a speech signal of a speaker input to a microphone 21 is amplified to an appropriate level by an outgoing speech amplifier 22. The amplified speech signal undergoes a PCM coding process by the PCM codec 18 to be converted into a digital audio signal, which is input to the compander 17. Also, a video signal output from a camera 30 is converted into a digital signal by the control unit 23, and is input to the compander 17.

The compander 17 detects the amount of energy of input speech from the digital audio signal output from the PCM codec 18, and determines a transmission data rate based on this detection result. The compander 17 encodes the digital audio signal to a signal of a format according to the transmission data rate, thereby generating audio data. Also, the compander 17 encodes the digital video signal output from the control unit 23 to generate video data. The compander 17 packetizes these audio and video data according to a predetermined transmission format using a multiplexer/demultiplexer, and outputs this transmission packet data to the CDMA signal processing unit 16. When text data such as an email message or the like is output from the control unit 23, it is also multiplexed on the transmission packet data.

Note that the video data generated by the compander 17 is displayed on the main display 28 under the control of the control unit 23.

The CDMA signal processing unit 16 applies a spread spectrum process to the transmission packet data output from the compander 17 using spread codes assigned to a transmission channel. Then, the CDMA signal processing unit 16 outputs that output signal to a transmission circuit (TX) 15. The transmission circuit 15 modulates the spread spectrum signal using a digital modulation scheme such as a QPSK (Quadrature Phase Shift Keying) scheme or a QAM (Quadrature Amplitude Modulation) scheme. The transmission circuit 15 frequency-converts the transmission signal generated by this modulation process into a radio signal by mixing it with a local oscillation signal generated by the frequency synthesizer 14. The transmission circuit 15 then high-frequency-amplifies the radio signal to a transmission power level designated by the control unit 23. The amplified radio signal is supplied to the antenna 11 via the antenna duplexer 12, and is transmitted from the antenna 11 to the base station.

A sub display 29 displays information representing the operation mode of the cellular phone, incoming call notification information, and information representing the remaining capacity and charged state of a battery 25. A power supply circuit 26 generates a predetermined operation power supply voltage Vcc based on the output from the battery 25, and then supplies it to each circuit. A charging circuit (not shown) charges the battery 25.

In the cellular phone, the control unit 23 allows a user to set various operation settings via the input device 27 and main display 28. The contents of these settings are stored in a memory 33, read out by the control unit 23 as needed, and used for operation control. The memory 33 comprises a nonvolatile memory such as a flash memory. The control unit 23, input device 27, main display 28, and memory 33 implement a function of setting the various operation settings.

The cellular phone also has a function of periodically notifying the user of a missed call. This missed call notification function is implemented by generating a ringing tone or vibration in accordance with the operation settings. Like other settings, a missed call notification function ON/OFF setting and a missed call notification setting are set by the control unit 23 via the input device 27 and main display 28, and stored in the memory 33.

The cellular phone allows the user to set so that a missed call notification is not performed depending on the type of an incoming call even when the missed call notification function is ON. Examples of the incoming calls not to be notified are an incoming call without notification of a caller's telephone number, an incoming call from a public telephone, an incoming call from a person who is not registered in an address book, an incoming call from a designated telephone number, and an incoming call in a short ringing time for an incoming call.

In order to select a missed call to be notified from the missed calls to be notified, a priority order of the missed calls to be notified is set. For example, the priority order is set in order of the person registered as an important caller by the user, the person who has generated the largest number of missed calls, the person registered in an address book, and the person who has generated the oldest missed call.

Figure 2:
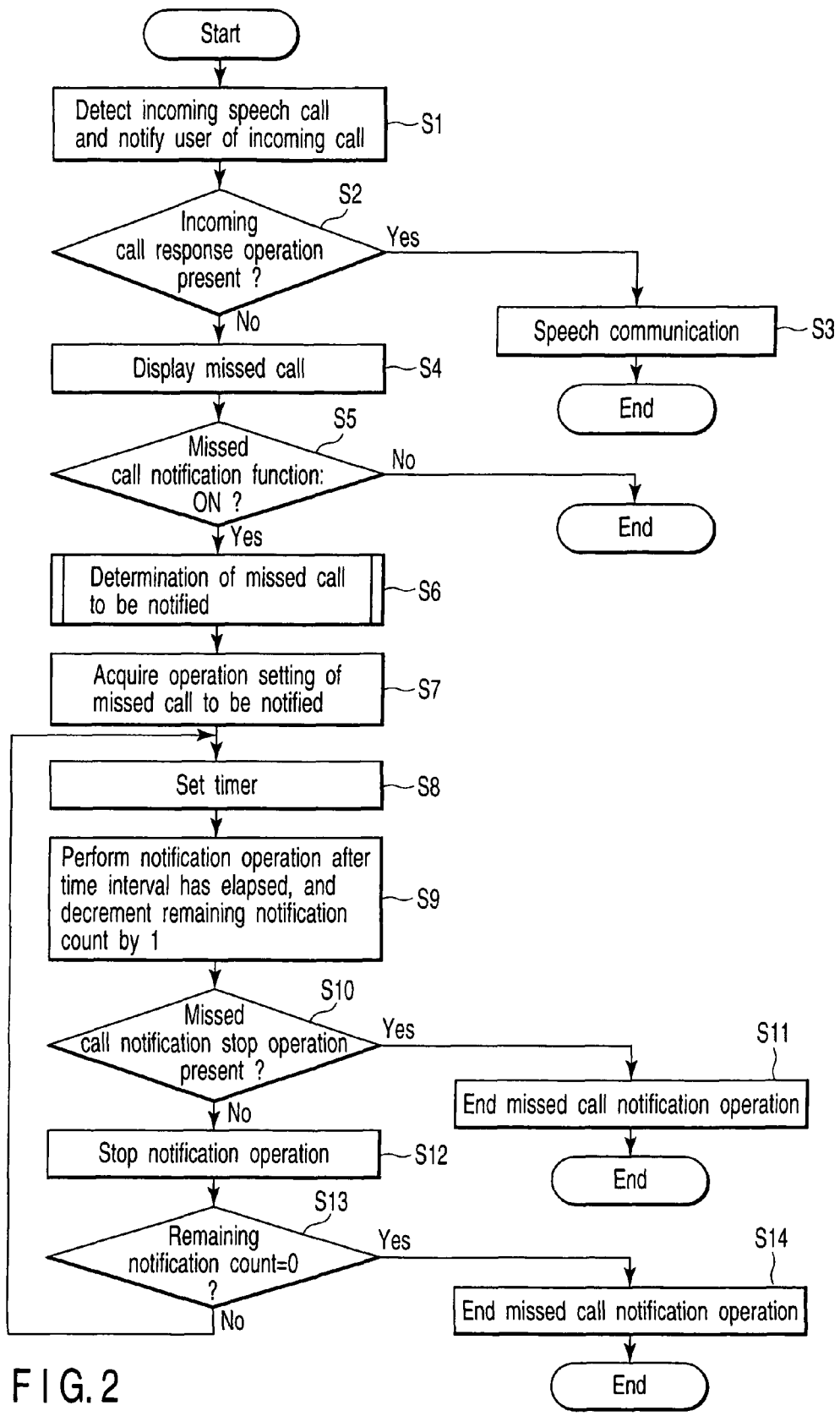
FIG. 2 is a flowchart showing a control sequence and control contents of the cellular phone in FIG. 1 when an incoming speech call is received.

An operation performed when an incoming speech call is received will be described below with reference to FIG. 2. FIG. 2 is a flowchart showing a control sequence and control contents when an incoming speech call is received. Basically, the operation is controlled by the control unit 23. Assume that an incoming speech call is received in a standby state. The incoming speech call is not only a voice call by a normal telephone but also a video phone call.

The cellular phone periodically receives an incoming call signal from a base station in the standby state. In step S1, the cellular phone receives an incoming speech call for it, and notifies the user of this incoming call in accordance with a normal incoming call operation setting stored in the memory 33. The user is appropriately notified of the incoming call by at least one of the following operations: generating a ringing tone from the loudspeaker 20, generating vibration by a vibrator 31, and blinking an incoming call lamp 32 comprising a light-emitting device such as an LED. Examples of the normal incoming call operation settings are the presence/absence of a ringing tone, a ringing tone volume, a ringing tone pattern (beep, melody, voice, or the like), the presence/absence of vibration, a vibration pattern, the ringing time, the presence/absence of image display, and a displayed image (animation). Note that when a silent mode is ON, a silent mode setting has a priority over other settings.

In step S2, it is determined whether the user has executed an incoming call response operation within the ringing time. If YES in step S2, the user performs speech communication in step S3. After the speech communication ends, the cellular phone is returned to the standby state. If a missed call has been received before the current incoming speech call is received, the main display 28 displays a missed call log. On the other hand, if NO in step S2, the main display 28 or sub display 29 displays information (icon or message) representing that "a missed call is received" in step S4, and the incoming call lamp 32 blinks.

In step S5, the missed call notification function ON/OFF setting is determined. When the missed call notification function is OFF, the cellular phone is returned to the standby state. On the other hand, when the missed call notification function is ON, the missed call to be notified is determined in step S6.

Figure 3:
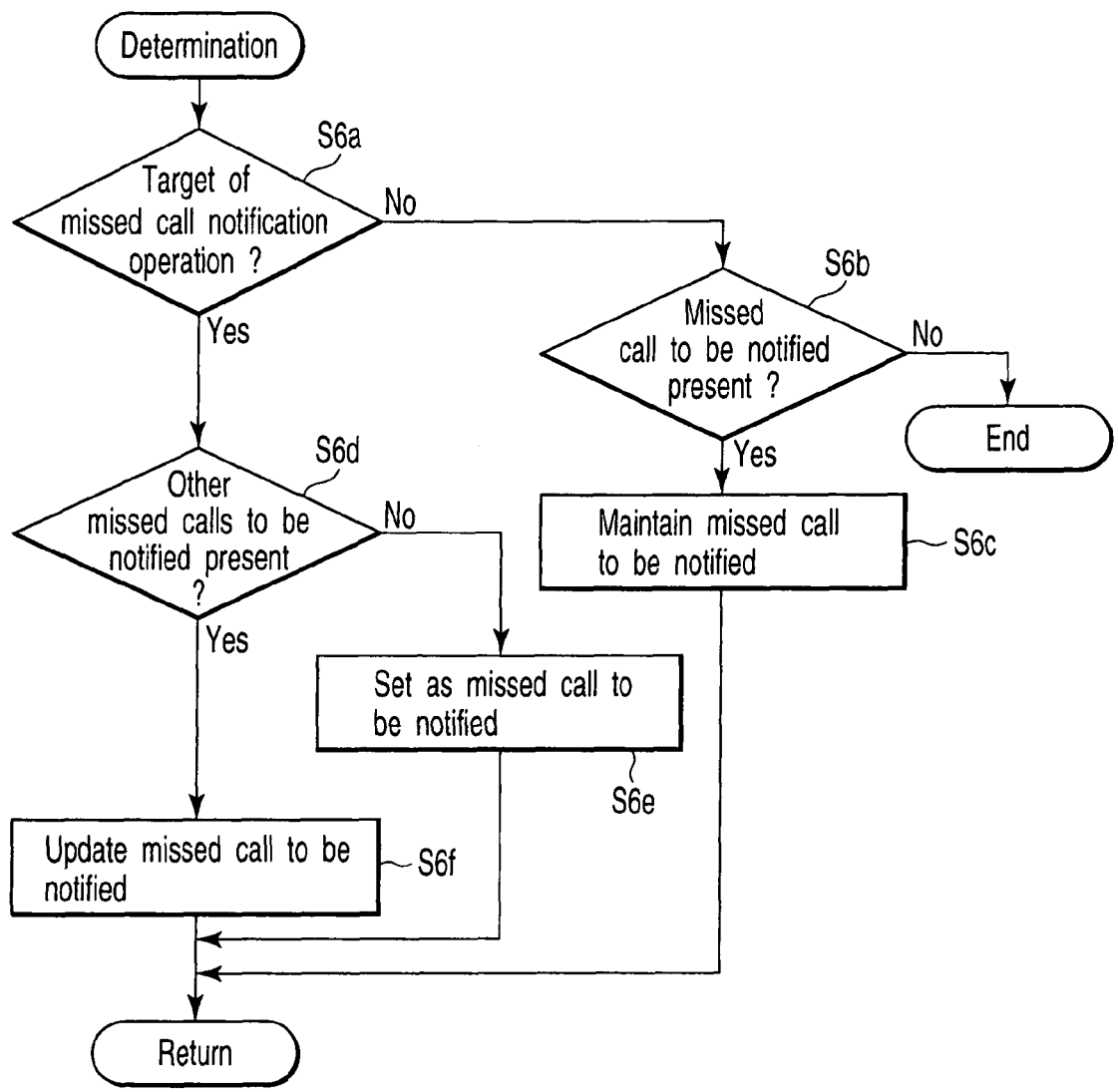
FIG. 3 is a flowchart showing a control sequence and control contents for determining a missed call to be notified.

An operation of determining the missed call to be notified will be described below with reference to FIG. 3. FIG. 3 is a flowchart showing a control sequence and control contents for determining the missed call to be notified.

In step S6a, it is determined whether the current missed call is to be notified. This determination is performed by checking whether the current missed call corresponds to the above-described missed call not to be notified.

If NO in step S6a, it is determined in step S6b whether any missed call to be notified has been received other than the current missed call. In other words, it is determined whether the missed call notification has been performed when the current missed call is received. If NO in step S6b, the cellular phone is returned to the standby state. If YES in step S6b, the missed call to be notified is maintained in step S6c.

On the other hand, if YES in step S6a, it is determined in step S6d whether any missed call to be notified has been received other than the current missed call. If NO in step S6d, the current missed call is set as the missed call to be notified in step S6e. If YES in step S6d, the missed call to be notified is selected and updated in accordance with setting of the priority order in step S6f.

For example, assume that the priority order of the missed calls to be notified is set in order of the person registered as an important caller by the user, the person who has generated the largest number of missed calls, the person registered in an address book, and the person who has generated the oldest missed call. In this case, the number of missed calls is first narrowed down in accordance with the priority order given as the person registered as an important caller by the user. If the number of missed calls is narrowed down to one with this operation, it is to be notified; if not, the number of missed calls is further narrowed down in accordance with the priority order given as the person who has generated the largest number of missed calls. If the number of missed calls is narrowed down to one with this operation, it is to be notified; if not, the number of missed calls is further narrowed down in accordance with the priority order given as the person registered in an address book. If the number of missed calls is narrowed down to one with this operation, it is to be notified; if not, the number of missed calls is further narrowed down to one in accordance with the priority order given as the person who has generated the oldest missed call, and it is to be notified.

After determining the missed call to be notified in step S6 shown in FIG. 2, the missed call notification setting for the missed call to be notified is acquired from the memory 33 in step S7. Examples of the missed call notification settings are a time interval between the missed call notifications, a notification count, the presence/absence of the ringing tone, a ringing tone volume, a ringing tone pattern (beep, melody, voice, or the like), the presence/absence of vibration, a vibration pattern, the ringing time, the presence/absence of image display, and the displayed image (animation). The missed call notification setting includes an item common to the normal incoming call operation setting. However, the missed call notification setting can be set independently of the normal incoming call operation setting such that the user can determine whether the current notification is the normal incoming call notification or missed call notification. Furthermore, the missed call notification setting can be set for each person registered in the address book other than a common setting such that the user can determine the caller of the missed call. Note that the missed call notification time interval may be a predetermined value, or gradually prolonged, e.g., 5-min interval between the first and second operations, and 10-min interval between the second and third notifications.

In step S8, a timer is set in accordance with setting of a missed call notification time interval acquired in step S7. When the missed call notification time interval has elapsed, the notification starts in step S9 in accordance with the missed call notification setting acquired in step S7, and a remaining notification count is decremented by 1. The missed call notification is executed by generating a notification sound (which may be the same as or different from the ringing tone obtained in step S1) from the loudspeaker 20, and/or generating vibration by the vibrator 31. Even when the silent mode is set, the notification sound may be generated in the missed call notification in step S9. The process in step S9 needs to be repeated in accordance with the remaining notification count. In this case, the volume may increase or decrease in accordance with the remaining notification count. The ringing time of the notification sound may also increase or decrease in accordance with the remaining notification count. That is, the missed call notification setting can be set to be changed in accordance with the remaining notification count. The missed call notification may be performed by blinking the incoming call lamp 32 (with or without the notification sound).

In step S10, it is monitored whether the user has executed an operation of stopping the missed call notification during the missed call notification. Examples of the operations of stopping the missed call notification are an operation of pressing a specific or arbitrary button, and an operation of opening a flip-style, folding-style, or slide-style cellular phone.

If YES in step S10, the missed call notification stops, the information representing "a missed call is received" disappears from the main display 28 or sub display 29, and blinking of the incoming call lamp 32 is stopped in step S11. The main display 28 displays a list of the missed calls.

On the other hand, if NO in step S10, the missed call notification stops in step S12, and whether the remaining notification count reaches 0 is determined in step S13. If NO in step S13, the process returns to step S8, and the subsequent processes are repeated. If YES in step S13, the missed call notification ends in step S14, and the cellular phone is returned to the standby state.

In the above description, the incoming speech call is received in the standby state. When the telephone incoming call is received in a state other than the standby state, the operation is executed in accordance with setting of a contention operation. The contention operation of the missed call notification is executed in accordance with setting of the contention operation in the normal incoming call operation. For example, when the normal incoming call is set not to be notified while the user operates the cellular phone, e.g., when playing back music, using a browser, or generating email, the missed call notification starts after the application ends or enters in a sleep state.

The cellular phone also has a function of periodically notifying the user of unread email. This unread email notification function is implemented by generating an email reception sound or vibration in accordance with the operation settings. Like other settings, an unread email notification function ON/OFF setting and an unread email notification setting are set by the control unit 23 via the input device 27 and main display 28, and stored in the memory 33.

The cellular phone allows the user to set so that an unread email notification is not performed depending on the type of email even when the unread email notification function is ON. Examples of the email messages not to be notified are email from a person who is not registered in an address book, and email from a designated email address.

In order to select unread email to be notified from the unread email messages to be notified, a priority order of the unread email messages to be notified is set. For example, the priority order is set in order of the person registered as an important originator by the user, the person who has generated the largest number of unread email messages, the person registered in an address book, and the person who has generated the oldest unread email.

Figure 4:
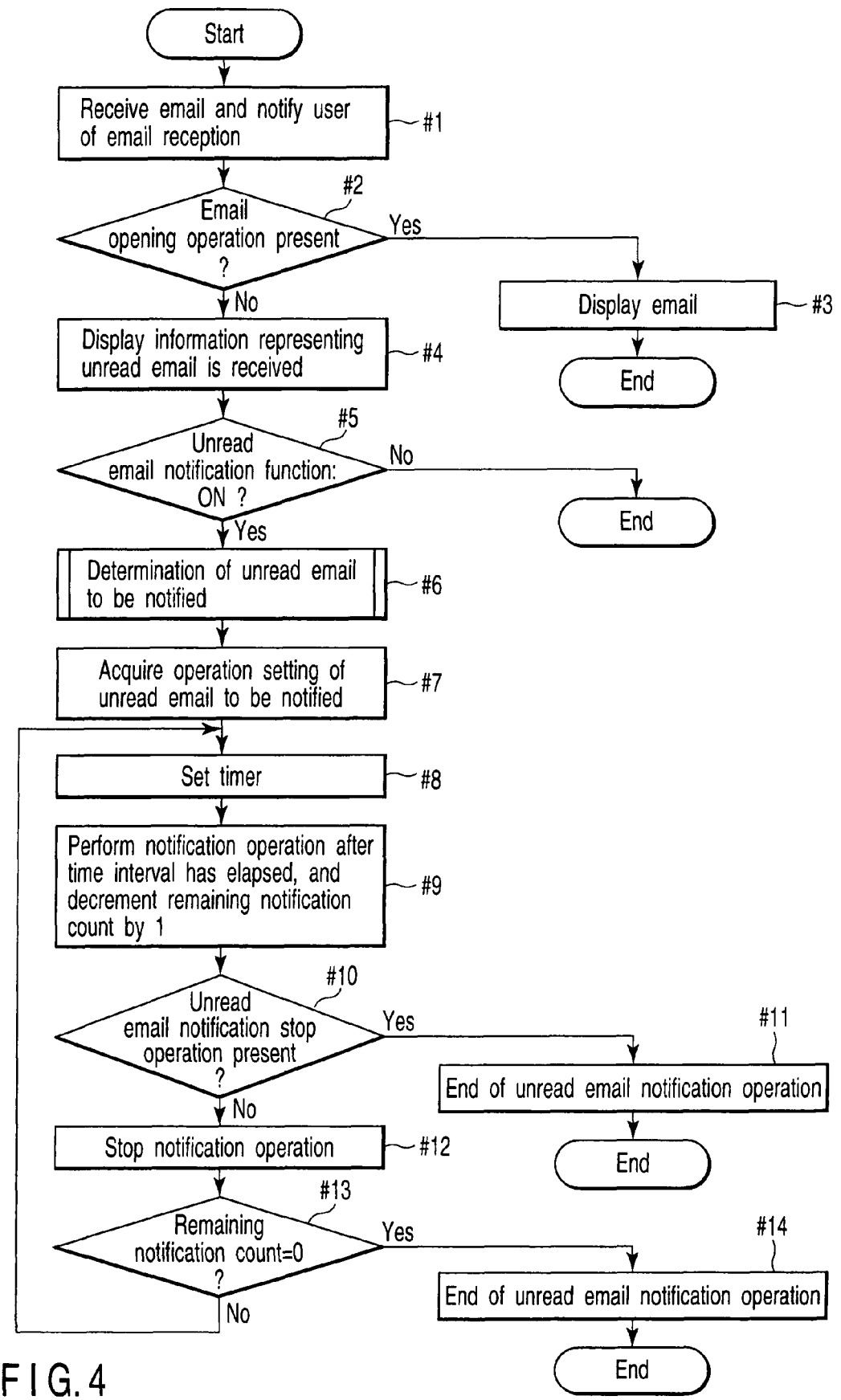
FIG. 4 is a flowchart showing a control sequence and control contents of the cellular phone in FIG. 1 when email is received.

An operation performed when email is received will be described below with reference to FIG. 4. FIG. 4 is a flowchart showing a control sequence and control contents when the email is received. Basically, the operation is controlled by the control unit 23. Assume that the email is received in a standby state.

The cellular phone periodically receives the email from a base station in the standby state. In step #1, the cellular phone receives the email for it, and notifies the user of this email reception result in accordance with an email reception operation setting stored in the memory 33. The user is appropriately notified of the email by at least one of the following operations: generating an email reception sound from the loudspeaker 20, generating vibration by the vibrator 31, and blinking the incoming call lamp 32 comprising the light-emitting device such as the LED. Examples of the email reception operation settings are the presence/absence of the email reception sound, an email reception sound volume, an email reception sound pattern (beep, melody, voice, or the like), the presence/absence of vibration, a vibration pattern, the ringing time, the presence/absence of image display, and a displayed image (animation). Note that when a silent mode is ON, a silent mode setting has a priority over other settings.

In step #2, it is determined whether the user has executed an email opening operation within the ringing time. If YES in step #2, the main display 28 displays the opened email, and the cellular phone is returned to the standby state. On the other hand, if NO in step #2, the main display 28 or sub display 29 displays information (icon or message) representing that "unread email is received" in step #4, and the incoming call lamp 32 blinks.

In step #5, the unread email notification function ON/OFF setting is determined. When the unread email notification function is OFF, the cellular phone is returned to the standby state. On the other hand, when the unread email notification function is ON, the unread email to be notified is determined in step #6.

Figure 5:
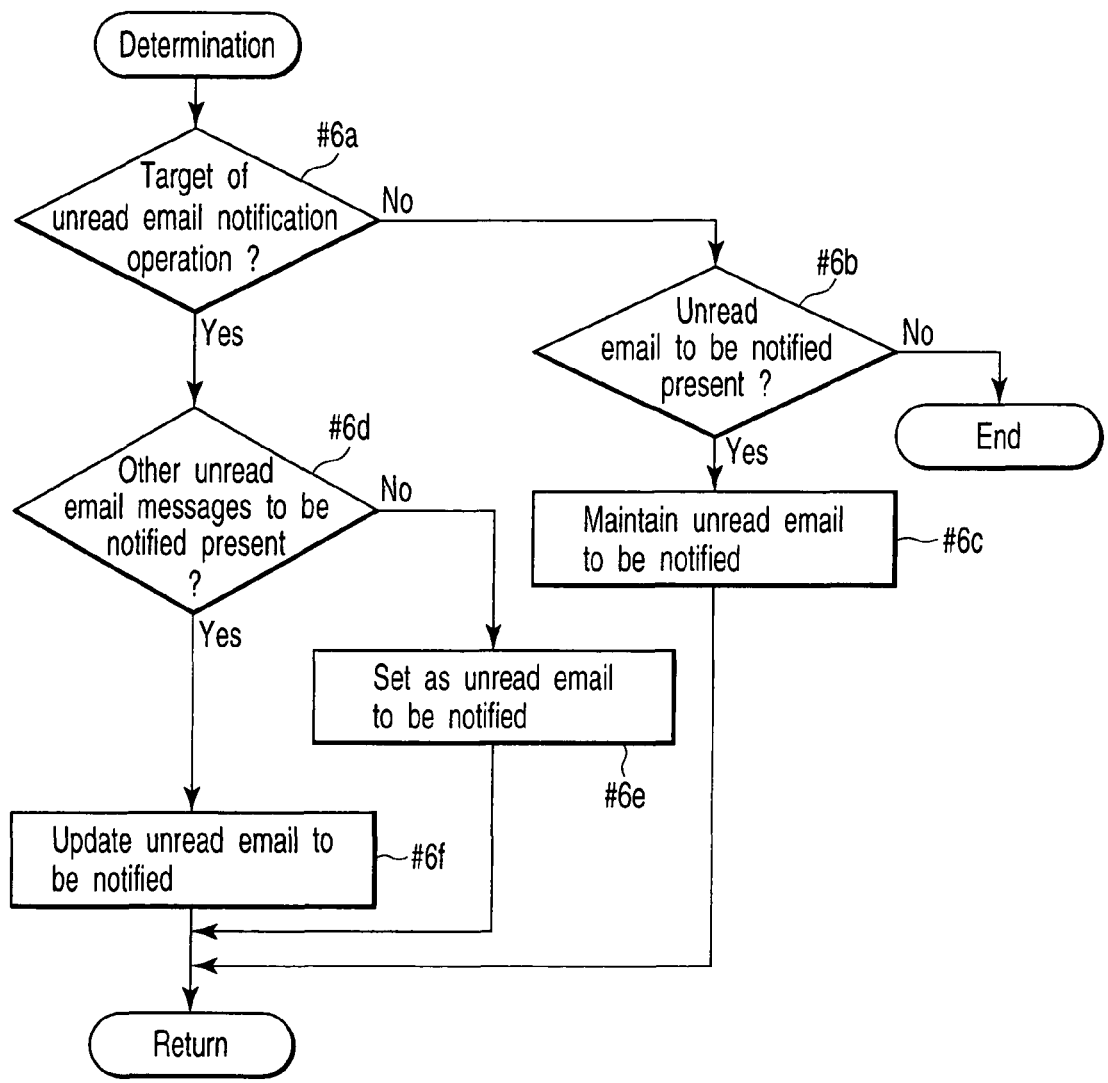
FIG. 5 is a flowchart showing a control sequence and control contents for determining unread email to be notified.

An operation of determining the unread email to be notified will be described below with reference to FIG. 5. FIG. 5 is a flowchart showing a control sequence and control contents for determining the unread email to be notified.

In step #6a, it is determined whether the current unread email is to be notified. This determination is performed by checking whether the current unread email corresponds to the above-described unread email not to be notified.

If NO in step #6a, it is determined in step #6b whether any unread email to be notified has been received other than the current unread email. In other words, it is determined whether the unread email notification has been performed when the current unread email is received. If NO in step #6b, the cellular phone is returned to the standby state. If YES in step #6b, the unread email to be notified is maintained in step #6c.

On the other hand, if YES in step #6a, it is determined in step #6d whether any unread email to be notified has been received other than the current unread email. If NO in step #6d, the current unread email is set as the unread email to be notified in step #6e. If YES in step #6d, the unread email to be notified is selected and updated in accordance with setting of the priority order in step #6f.

For example, assume that the priority order of the unread email messages to be notified is set in order of the person registered as an important originator by the user, the person who has generated the largest number of unread email messages, the person registered in an address book, and the person who has generated the oldest unread email. In this case, the number of unread email messages is first narrowed down in accordance with the priority order given as the person registered as an important originator by the user. If the number of unread email messages is narrowed down to one with this operation, it is to be notified; if not, the number of unread email messages is further narrowed down in accordance with the priority order given as the person who has generated the largest number of unread email messages. If the number of unread email messages is narrowed down to one with this operation, it is to be notified; if not, the number of unread email messages is further narrowed down in accordance with the priority order given as the person registered in an address book. If the number of unread email messages is narrowed down to one with this operation, it is to be notified; if not, the number of unread email messages is further narrowed down to one in accordance with the priority order given as the person who has generated the oldest unread email, and it is to be notified.

After determining the unread email to be notified in step #6 shown in FIG. 4, the unread email notification setting for the unread email to be notified is acquired from the memory 33 in step #7. Examples of the unread email notification settings are a time interval between the unread email notifications, a notification count, the presence/absence of the email reception sound, an email reception sound volume, an email reception sound pattern (beep, melody, voice, or the like), the presence/absence of vibration, a vibration pattern, the ringing time, and a displayed image (animation). The unread email notification setting includes an item common to the email reception operation setting. However, the unread email notification setting can be set independently of the email reception operation setting such that the user can determine whether the current notification is the email reception notification or unread email notification. Furthermore, the unread email notification setting can be set for each person registered in the address book other than a common setting such that the user can determine the originator of the unread email. Note that the unread email notification time interval may be a predetermined value, or gradually prolonged, e.g., 5-min interval between the first and second operations, and 10-min interval between the second and third notifications.

In step #8, a timer is set in accordance with setting of an unread email notification time interval acquired in step #7. When the unread email notification time interval has elapsed, the notification starts in step #9 in accordance with the unread email notification setting acquired in step #7, and a remaining notification count is decremented by 1. The unread email notification is executed by generating a notification sound (which may be the same as or different from the email reception sound obtained in step #1) from the loudspeaker 20, and/or generating vibration by the vibrator 31. Even when the silent mode is set, the notification sound may be generated in the unread email notification in step #9. The process in step #9 needs to be repeated in accordance with the remaining notification count. In this case, the volume may increase or decrease in accordance with the remaining notification count. The ringing time of the notification sound may also increase or decrease in accordance with the remaining notification count. That is, the unread email notification setting can be set to be changed in accordance with the remaining notification count. The unread email notification may be performed by blinking the incoming call lamp 32 (with or without the notification sound).

In step #10, it is monitored whether the user has executed an operation of opening the email during the unread email notification.

If YES in step #10, the unread email notification stops, the information representing "unread email is received" disappears from the main display 28 or sub display 29, and blinking of the incoming call lamp 32 is stopped in step #11. The main display 28 displays the opened email.

On the other hand, if NO in step #10, the unread email notification stops in step #12, and whether the remaining notification count reaches 0 is determined in step #13. If NO in step #13, the process returns to step #8, and the subsequent processes are repeated. If YES in step #13, the unread email notification ends in step #14, and the cellular phone is returned to the standby state.

In the above description, the email is received in the standby state. When the email is received in a state other than the standby state, the operation is executed in accordance with setting of a contention operation. The contention operation of the unread email notification is executed in accordance with setting of the contention operation in the email reception operation. For example, when the email reception is set not to be notified while the user operates the cellular phone, e.g., when playing back music, using a browser, or generating email, the unread email notification starts after the application ends or enters in a sleep state.

The embodiment of the present invention has been described herein with reference to the accompanying drawing. However, the present invention is not limited to such embodiment, and various changes and modifications may be effected therein without departing from the spirit or scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable terminal, comprising:
an output part configured to output a ringing tone; a vibrator; and a controller configured to detect a missed call indicating absence of a response to an incoming call, to perform notification of the missed call with the ringing tone of the output part or a vibration generated by the vibrator based on the detection of the missed call, and to control the notification at predetermined intervals,
wherein the controller is configured to narrow down multiple missed calls logged in the portable terminal until a number of missed calls is reduced to one based on a plurality of preset conditions in accordance with an order of priority of the conditions, and to perform notification of a single missed call to which the multiple missed calls are reduced and a setting part configured to set a number of times the notification is to be performed, wherein the controller is configured to stop the notification of the missed call after the notification is performed the number of times set by the setting part.

2. The portable terminal as claimed in claim 1, wherein the controller is configured to stop the notification of the missed call in response to execution of an operation of stopping the notification of the missed call.

3. The portable terminal as claimed in claim 1, wherein:
whether the controller performs the notification of the missed call is set on an individual basis with respect to persons registered in an address book, and
the controller is configured to perform the notification based on the individual settings.

4. The portable terminal as claimed in claim 1, wherein the plurality of preset conditions include a condition of a person who has generated an oldest missed call.

5. A portable terminal, comprising:
an output part configured to output a ringing tone; a vibrator; and a controller configured to detect an unread email by determining whether a received email is opened, to perform notification of the unread email with the ringing tone of the output part or a vibration generated by the vibrator based on the detection of the unread email, and to control the notification at predetermined intervals,
wherein the controller is configured to narrow down multiple unread emails logged in the portable terminal to a single unread email based on a plurality of preset conditions in accordance with an order of priority of the conditions, and to perform notification of the single unread email and a setting part configured to set a number of times the notification is to be performed, wherein the controller is configured to stop the notification of the missed call after the notification is performed the number of times set by the setting part.

6. The portable terminal as claimed in claim 5, wherein the plurality of preset conditions include a condition of a person who has generated an oldest missed call.

* * * * *